US012597573B2

(12) United States Patent
Lamy et al.

(10) Patent No.: US 12,597,573 B2
(45) Date of Patent: Apr. 7, 2026

(54) PYROTECHNIC CIRCUIT BREAKER

(71) Applicant: Autoliv Development AB, Vargarda (SE)

(72) Inventors: Fabien Lamy, Taverny (FR); Maxime Grandiau, Thiescourt (FR)

(73) Assignee: Autoliv Development AB, Vargarda (SE)

( * ) Notice: Subject to any disclaimer, the term of this patent is extended or adjusted under 35 U.S.C. 154(b) by 263 days.

(21) Appl. No.: 18/552,117

(22) PCT Filed: Mar. 17, 2022

(86) PCT No.: PCT/EP2022/056983
§ 371 (c)(1),
(2) Date: Sep. 22, 2023

(87) PCT Pub. No.: WO2022/207341
PCT Pub. Date: Oct. 6, 2022

(65) Prior Publication Data

US 2024/0203674 A1 Jun. 20, 2024

(30) Foreign Application Priority Data

Mar. 29, 2021 (FR) ....................................... 2103176

(51) Int. Cl.
*H01H 9/38* (2006.01)
*H01H 9/52* (2006.01)
*H01H 39/00* (2006.01)

(52) U.S. Cl.
CPC ............ *H01H 39/006* (2013.01); *H01H 9/38* (2013.01); *H01H 9/52* (2013.01)

(58) Field of Classification Search
CPC .. H01H 9/30; H01H 9/38; H01H 9/52; H01H 39/006; H01H 39/004; H01H 39/008; H01H 85/00

(Continued)

(56) References Cited

U.S. PATENT DOCUMENTS 5,783,987 A * 7/1998 Kern ...................... H01H 39/00 337/403
8,716,615 B2 * 5/2014 Fukuyama ........... H01H 39/006 200/61.08

(Continued)

FOREIGN PATENT DOCUMENTS

DE 102009009398 A1 8/2010
DE 102017011631 A1 6/2019

(Continued)

*Primary Examiner* — William A Bolton
(74) *Attorney, Agent, or Firm* — Harness, Dickey & Pierce, P.L.C.; Ryan W. Massey

(57) ABSTRACT

A pyrotechnic circuit breaker comprising:

a housing, an electrical conductor passing through the housing, at least one blade, able to move so as to cut at least one portion of the electrical conductor, the breaking of the electrical conductor defining a cut area separating a first cut end of the electrical conductor from a second cut end of the electrical conductor, a pyrotechnic actuator, the circuit breaker having a first arc path allowing a first electric arc to be established directly from the first cut end to the second cut end, characterized in that the circuit breaker comprises conductive cooling features so as to have a secondary arc path passing through a first conductive cooling feature and through a secondary conductive cooling feature or a last conductive cooling feature.

15 Claims, 3 Drawing Sheets

(58) Field of Classification Search
USPC ............. 200/61.08, 244; 337/157, 401, 273; 83/639.4
See application file for complete search history.

(56) References Cited

U.S. PATENT DOCUMENTS

| | | | | |
|---|---|---|---|---|
| 9,953,783 | B2 * | 4/2018 | Fellmer | H01H 39/006 |
| 10,468,216 | B2 * | 11/2019 | Marlin | H01H 39/006 |
| 10,763,064 | B2 * | 9/2020 | Mauthofer | B60L 3/04 |
| 12,040,144 | B2 * | 7/2024 | Primel | H01H 39/006 |
| 2015/0200065 | A1 | 7/2015 | Koetter et al. | |
| 2020/0035437 | A1 * | 1/2020 | Gaudinat | H01H 39/00 |
| 2020/0194202 | A1 | 6/2020 | Mauthofer et al. | |
| 2022/0328268 | A1 * | 10/2022 | Kesarkar | H01H 39/006 |

FOREIGN PATENT DOCUMENTS

| | | | |
|---|---|---|---|
| WO | 2014048913 | A1 | 4/2014 |
| WO | 2020099546 | A1 | 5/2020 |

* cited by examiner

[Fig. 1]
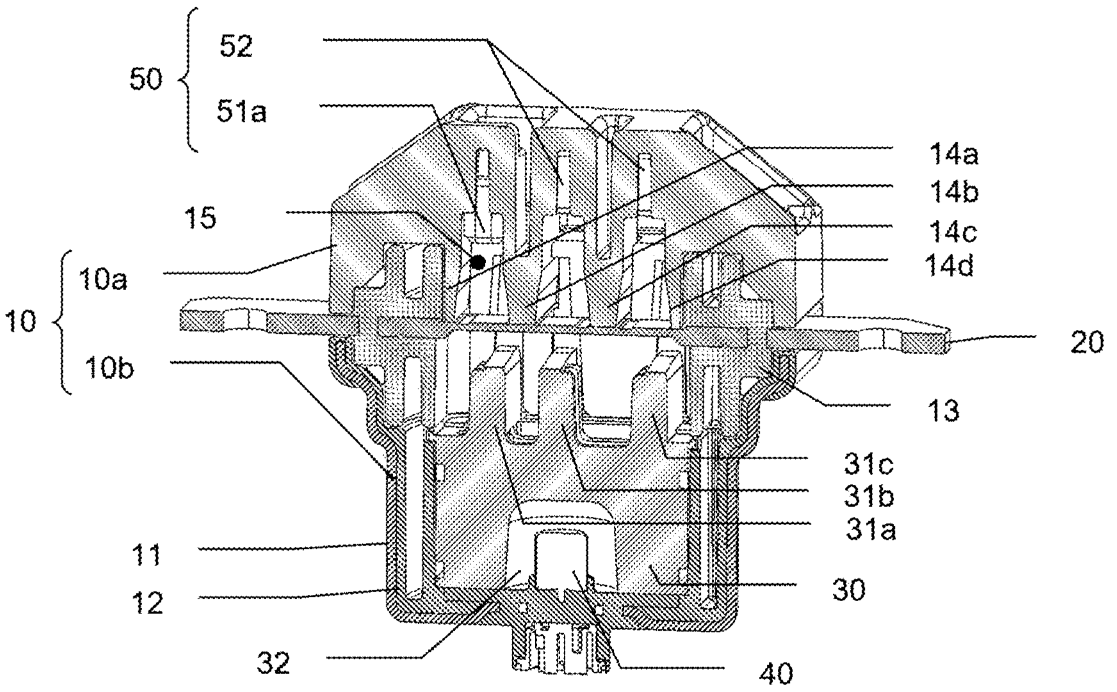
[Fig. 2]
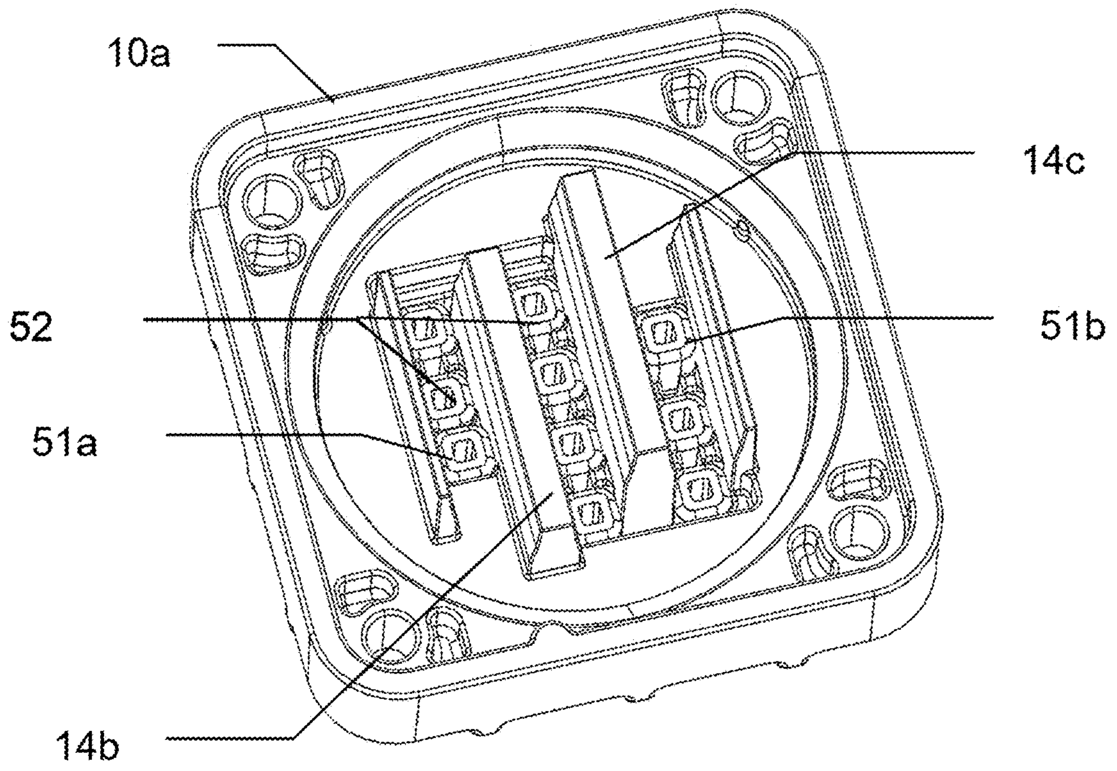

[Fig. 3]
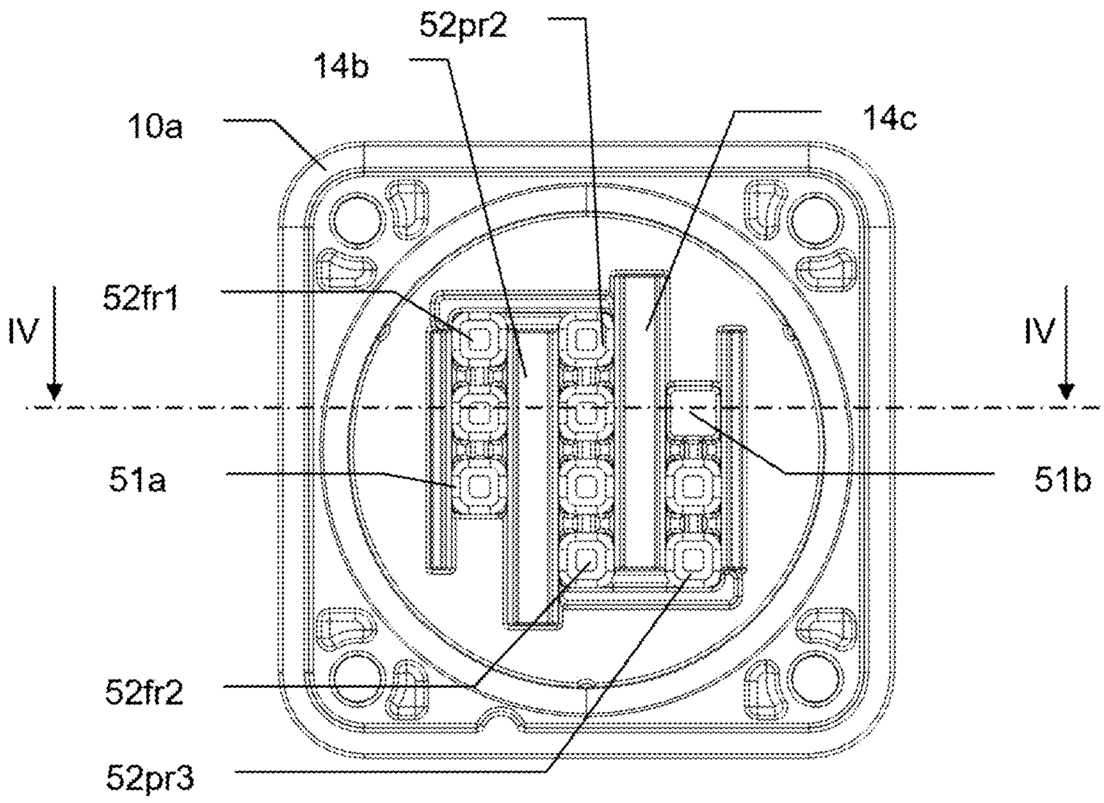
[Fig. 4]
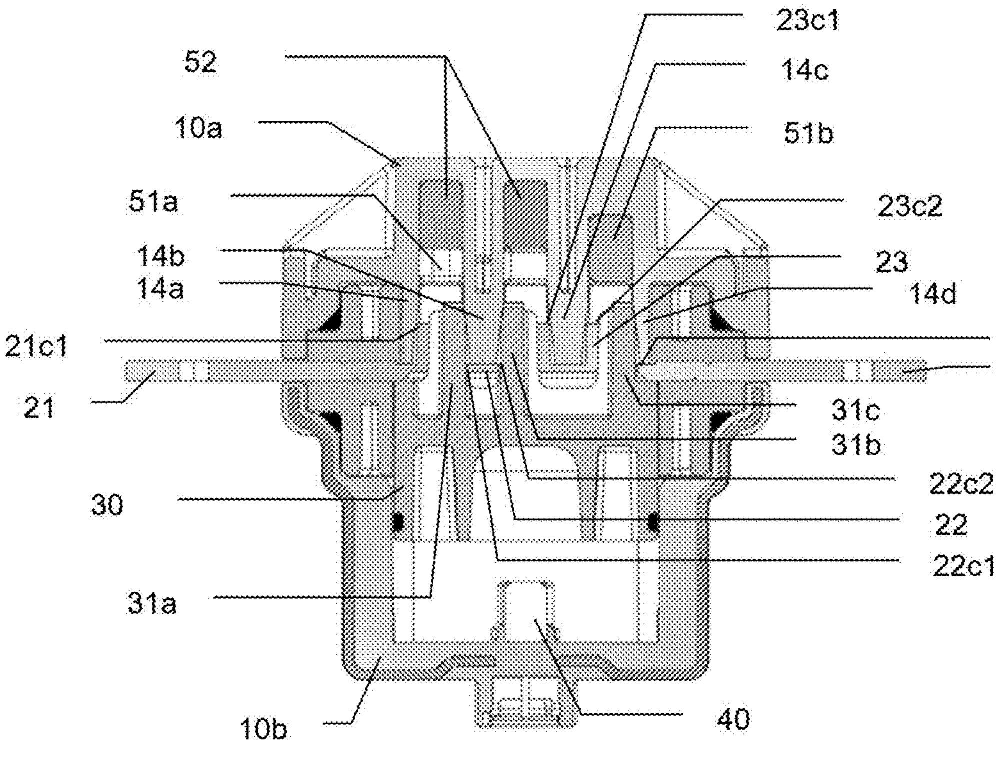

[Fig. 5]
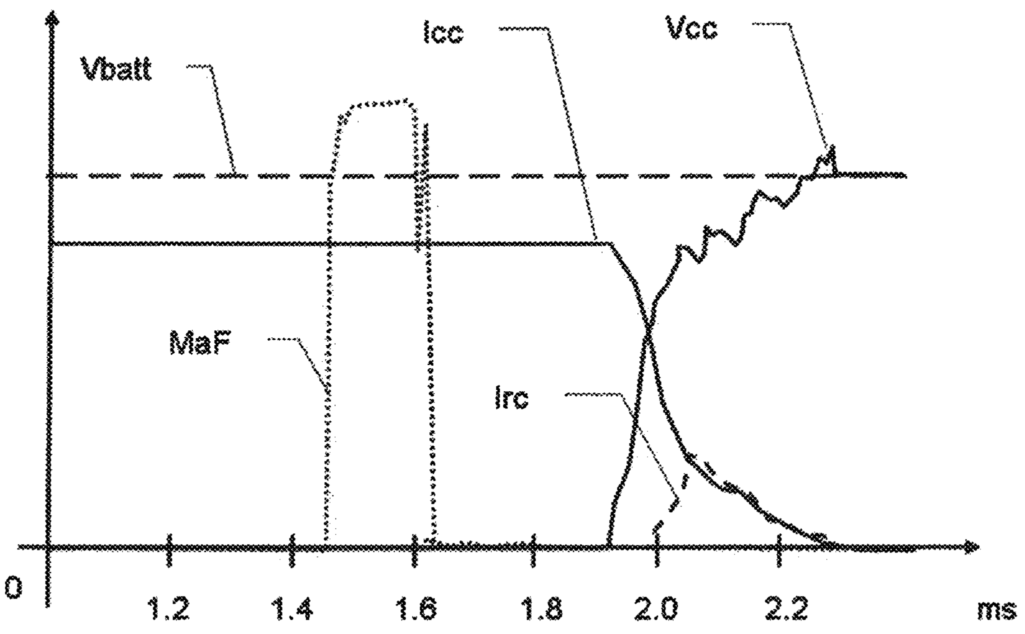

PYROTECHNIC CIRCUIT BREAKER

TECHNICAL FIELD OF THE INVENTION

The present invention generally relates to a pyrotechnic circuit breaker intended to be mounted on an automotive vehicle.

STATE OF THE ART

Pyrotechnic circuit breaker devices are known in the prior art, such as that disclosed in document WO2020099546A1. However, this system may have limits in terms of managing the energy, and in particular the heat, generated by the electric arcs created when a circuit is opened under tension, in particular when high currents and/or high voltages and/or high inductances must be cut. The currents flowing through the electrical circuits of electric vehicles may have intensities of several thousand or tens of thousands of amps, with voltages that may reach one or more thousand volts. It is necessary to be able to cut such electrical circuits quickly without, however, the arc(s) created at the opening of the powered circuit generating pressure and/or temperature conditions that can damage the device. Document US2020194202A1 relates to an electrical fuse box or a connection box, with a circuit breaker. Document WO2014048913A1 relates to a short-circuit switch.

DISCLOSURE OF THE INVENTION

One aim of the present invention is to address the disadvantages of the prior art mentioned above and in particular, first of all, to propose a compact pyrotechnic circuit breaker that can be used to effectively and rapidly break an electrical conductor forming part of an electrical circuit through which low, medium or strong currents pass, at low or high voltage, while withstanding the pressure and/or temperature conditions even if electric arcs are inevitably generated during the breaking of the electrical conductor.

To this end, a first aspect of the invention relates to a pyrotechnic circuit breaker comprising:

- a housing, defining a cut-off chamber,
- an electrical conductor to be broken, arranged to form part of an electrical circuit, and at least partially arranged in the housing so as to pass through the cut-off chamber,
- at least one blade, able to move between a rest position and a final position, and arranged to break at least one portion of the electrical conductor located in the cut-off chamber, when the blade passes from the rest position to the final position, the breaking of the electrical conductor defining a cut area separating a first cut end of the electrical conductor from a second cut end of the electrical conductor,
- a pyrotechnic actuator, arranged to move the blade from the rest position to the final position when it is actuated,
- at least one cooling device arranged in the cut-off chamber for cooling gases present in the cut-off chamber after actuating the pyrotechnic actuator, the circuit breaker having a first arc path allowing a first electric arc to be established directly from the first cut end to the second cut end, characterized in that the cooling device comprises a plurality of conductive cooling features arranged in the cut-off chamber so that the circuit breaker has a secondary arc path allowing secondary electric arcs to be established:

- from the first cut end to a first conductive cooling feature,

- from the first conductive cooling feature to a secondary conductive cooling feature or a last conductive cooling feature, and
- from the secondary conductive cooling feature or the last conductive cooling feature to the second cut end.

The circuit breaker according to the above implementation comprises a plurality of conductive cooling features (including secondary conductive cooling features), which allows the generation of several secondary electric arcs able to be established between the conductive cooling features, which increases on the one hand the total voltage across the terminals of the device and on the other hand the dissipation of energy or its efficiency/speed and thus allows rapid breaking while limiting an excessive increase in temperature and/or pressure. According to the above implementation, the conductive cooling features (including the secondary conductive cooling features) are arranged in the cut-off chamber, that is, at least a part of each conductive cooling feature opens onto or is arranged opposite the cut-off chamber. In particular, at least one conductive cooling feature, and preferably at least two conductive cooling features, has (have) a part directly opposite the electrical conductor to be broken.

Typically, the first electric arc is established from the first cut end to the second cut end during the electrical breaking of the electrical circuit comprising the electrical conductor to be broken, that is, during the physical or mechanical breaking of the electrical conductor, during the separation of the first cut end from the second cut end, and when the first cut end moves away from the second cut end the arc extends, which increases the voltage across its terminals.

Typically, the secondary electric arcs are established between the first cut end, the conductive cooling features (including the secondary conductive cooling features), the second cut end during the electrical breaking of the electrical circuit comprising the electrical conductor to be broken. This means that these secondary arcs are established after the physical or mechanical breaking of the electrical conductor, once the first cut end is separated from the second cut end when the electrical and/or environmental conditions are more favorable to the establishment of secondary arcs than first arc(s). In particular, it may be noted that the secondary electric arcs are established between separate components (at different potentials).

Typically, the secondary electric arcs may be provided to be able to be established in series between the first cut end, the conductive cooling features, the second end. In other words, the secondary electric arcs form a series of secondary electric arcs that connect two cut ends via at least one conductive cooling feature.

Typically, the blade is arranged to mechanically separate the first cut end from the second cut end. It is possible to envisage shearing, but also breaking by elongation, tearing or pulling.

Typically, the circuit breaker may comprise a piston which carries the blade and which separates the blade from the pyrotechnic actuator. Thus, the cut-off chamber is protected from the particles generated by the pyrotechnic actuator, which preserves the insulating resistances after operation and protects the control circuit of the device.

According to one embodiment, the conductive cooling features (including the secondary conductive cooling features) may be metal parts. Porous parts or parts with internal voids can be provided. It is possible to provide the conductive cooling features with a metal wire. Provision may be made to compact the metal wire on itself to form the conductive cooling features. In other words, each conductive cooling feature is formed with one or several compacted wires. It is also possible to provide a compacted knit, or even porous sintered parts. Such parts easily conduct the current with low resistance, and can dissipate energy.

Indeed, according to one embodiment, the conductive cooling features (including secondary conductive cooling features) may be parts which are porous and/or with voids and/or with passages and/or with gaps, and/or with a density much lower than that of the metal from which they are formed, and which can easily be passed through by the gases, which provides a large exchange surface and an interesting cooling capacity for the gas of the cut-off chamber. It can be noted that during operation, the gases of the cut-off chamber can be compressed by the movement of the blade, so that there is displacement of these gases in the cooling features, within the clearances, and this allows an efficient exchange of heat to cool the gases of the cut-off chamber. In other words, the conductive cooling features (including the secondary conductive cooling features) can be provided to perform cooling by convection (heat exchange between a gas and a solid).

According to one embodiment, the conductive cooling features (including secondary conductive cooling features) may not be solid and/or non-porous parts.

According to one embodiment, the conductive cooling features (including secondary conductive cooling features) may be distinct, and/or separated, and/or insulated from the electrical conductor to be broken.

According to one embodiment, the conductive cooling features (including the secondary conductive cooling features) can be housed or arranged in the cut-off chamber independently: these are distinct components.

It may also be noted that the conductive cooling features (including the secondary conductive cooling features) can be (before and/or after breaking) electrically insulated from one another and/or from the conductor to be broken. It is for example possible to mount all or part of the conductive cooling features (including the secondary conductive cooling features) on a particular location of a housing made of insulating material (plastic, for example). A space or an absence of physical-electrical contact between all or part of the conductive cooling features (including secondary conductive cooling features) can be provided. In other words, and in any case before the pyrotechnic actuator is triggered, the conductive cooling features (including the secondary conductive cooling features) may be inactive parts that have no function and/or no interaction with the electrical conductor to be broken.

According to one embodiment, the conductive cooling features can be arranged at a predetermined distance from the electrical conductor and/or from the first cut end and/or the second cut end. In particular, the conductive cooling features can be arranged at a predetermined distance from the electrical conductor and/or from the first cut end and/or from the second cut end, before and/or during and/or after the breaking of the electrical conductor. Such a predetermined distance guarantees the constant presence of an air-filled space between the conductive cooling features and the first cut end and/or the second cut end. The air then forms an insulating medium and no direct contact is provided during operation between the conductive cooling features and the electrical conductor and/or the first cut end and/or the second cut end. Consequently, electric arcs can be established by ionizing the air or the gas contained in the cut-off chamber.

According to one embodiment, the predetermined distance can be defined so as to constantly guarantee a clearance between each of the conductive cooling features and the electrical conductor and/or the first cut end and/or the second cut end, and/or said at least one blade, during and after the breaking of the electrical conductor. Such a predetermined distance guarantees the constant presence of an air-filled space between the conductive cooling features and the first cut end and/or the second cut end. The air then forms an insulating medium and no direct contact is provided during operation between the conductive cooling features and the first cut end and/or the second cut end. Consequently, electric arcs can be established by ionizing the air or the gas contained in the cut-off chamber.

According to one embodiment, the conductive cooling features (including the secondary conductive cooling features) may be arranged in the cut-off chamber so that secondary electric arcs can be established along the secondary arc path only if before and/or during the breaking, the electrical conductor is traversed by an electrical current which may have an intensity greater than a threshold intensity and/or if after the breaking, a voltage across the circuit breaker terminals can be greater than a threshold voltage. In other words, the distance between the first cut end and the second cut end to establish the first electric arc and the distance between the conductive cooling features and the first cut end and/or the second cut end and/or the distances between cooling features to establish the secondary electric arcs are taken into account and adjusted to cause the establishment of the secondary electric arcs systematically beyond a certain current intensity before breaking and/or voltage after breaking.

According to one embodiment, the first arc path may have a restriction or narrow passage area or complete obstruction so that the secondary electric arcs can be established along the secondary arc path only if, upon breaking, the electrical conductor is traversed by an electrical current which may have an intensity greater than a threshold intensity and/or if, after breaking, a voltage across the circuit breaker terminals can be greater than a threshold voltage. The restriction or the narrow passage area or the complete obstruction on the first arc path may cause an increase in resistance or a decrease in the capacity to transmit current by the first electric arc such so that the establishment of the secondary electric arcs will be systematic beyond a certain current intensity before breaking and/or voltage after breaking.

According to one embodiment, the circuit breaker may comprise a matrix, the blade in the final position may bear on or be opposite the matrix so as to cut and/or separate the cut-off chamber into at least two secondary chambers, the restriction or the narrow passage area may be defined between the blade in the final position and the matrix, and the complete obstruction can be defined by a linear and/or surface contact between the matrix and the blade over an entire width of the electrical conductor.

According to one embodiment, the restriction or the narrow passage area can be formed by a hole and/or a groove provided in the blade and/or the matrix.

According to one embodiment, the restriction or the narrow passage area can be delimited by at least one wall made of plastic material intended to be eroded or able to be removed by ablation. Such an implementation makes it possible to generate insulating particles and to participate in the extinction of the first electric arc. The plastic material which is removed by ablation by the electric arc is vaporized and changes the conductivity of the medium wherein the electric arc propagates, which further increases the voltage of the arc. This makes it possible to reach a total arc voltage greater than the supply voltage more quickly. The surface of the part made of plastic material may for example be sublimated under the action of the high heat flow created by the electric arc.

According to one embodiment, the restriction or passage may have a cross-section of less than 0.5 $mm^2$ and/or a length of between 1 and 5 mm.

According to one embodiment, the circuit breaker may comprise a plurality of conductive cooling features (including the secondary conductive cooling features) arranged in the cut-off chamber, so that secondary electric arcs can be established between at least two adjacent conductive cooling features. The conductive cooling features can be arranged in order to cause the secondary electric arcs of the conductive cooling feature to be conveyed into a conductive cooling feature.

According to one embodiment, the conductive cooling features (including the secondary conductive cooling features) may be distinct and each separated from one another by a predetermined distance.

According to one embodiment, two adjacent conductive cooling features (including the secondary conductive cooling features) that can be located on the secondary arc path and separated by a predetermined intermediate distance may each be distant from the electrical conductor, and/or from the first cut end and/or from the second cut end by a distance greater than said intermediate distance. Such an implementation ensures that the secondary arc path includes all of the conductive cooling features.

According to one embodiment, the circuit breaker may comprise at least three conductive cooling features (including the secondary conductive cooling features) on the secondary arc path, so as to be able to define a first conductive cooling feature and a last conductive cooling feature located on the secondary arc path, and the first conductive cooling feature and the last conductive cooling feature may each be arranged closer to the electrical conductor, and/or to the first cut end and/or to the second cut end than the other conductive cooling features. The two conductive cooling features closest to one another will be the first and the last conductive cooling feature of the conductive cooling feature chain which will transmit the secondary electric arcs. In other words, the secondary arc path comprises a first conductive cooling feature, all of the other conductive cooling features, and a last conductive cooling feature that is closer to the second cut end than all of the other conductive cooling features. Thus, a first secondary electric arc is established between the first cut end and the first conductive cooling feature, one or more intermediate secondary arcs are established between the succession of the other conductive cooling features, up to the last conductive cooling feature, and a last secondary electric arc is established between the last conductive cooling feature and the second cut end.

According to one embodiment, at least two conductive cooling features (including the secondary conductive cooling features) can be separated by an insulating wall, for example made of plastic, the insulating wall possibly comprising a recess or a hole located on the secondary arc path. The position of the recess or hole guarantees that a secondary electric arc can be established between two adjacent cooling features.

According to one embodiment, the two conductive cooling features (including the secondary conductive cooling features), which can be separated by the insulating wall, can each have two ends, with a first end facing the cut-off chamber and/or the electrical conductor, and wherein the recess or hole can be offset from the first end, or can be arranged on the side of the second end of each conductive cooling feature opposite the first end. Such an implementation guarantees that the current passes through a significant length of the conductive cooling feature, which improves the dissipation of heat and energy.

According to one embodiment, the walls of the cut-off chamber can be covered with plastic, with the exception of the conductive cooling features and/or of the electrical conductor.

According to one embodiment, it may be provided to have cooling features overmolded in the housing (so long as a conductive part protrudes) to guarantee more regular dimensions and to facilitate manufacturing on an assembly line.

According to one embodiment, the blade can be arranged to detach a portion of the electrical conductor to be cut during the movement from the rest position to the final position. In other words, a free strand or a free portion is cut and then detached from the electrical conductor. There is therefore a cut area at each end of this detached portion of electrical conductor with, for each cut area, a first cut end and a second cut end. The first arc path will allow two first electric arcs to be established, one directly between the first cut end and the second cut end of a first cut area, and the other directly between the first cut end and the second cut end of a second cut area.

According to one embodiment, the circuit breaker may comprise a plurality of blades, so as to define:

- several cut areas each able to separate: a first cut end of the electrical conductor from a second cut end of the electrical conductor and at least one free section of electrical conductor after the breaking, and/or
- a first arc path that can allow a first electric arc to be directly established from the first cut end to the second cut end of a cut area and another first arc to be directly established from the first cut end to the second cut end of another cut area. The multiplication of the first electric arcs makes it possible to increase the breaking capacity. In other words, a succession of cut areas placed in series on the first arc path each have a first electric arc connecting the cut ends; the first electric arcs are in series.

According to one embodiment, the circuit breaker may comprise only a single secondary arc path passing through at least one and preferably at least two conductive cooling features (including the secondary conductive cooling features) to allow secondary electric arcs to be established from the first cut end of said one cut area to the second cut end of said another cut area. In other words, the secondary electric arcs are in series along the second arc path.

According to one embodiment, the conductive cooling features (including the secondary conductive cooling features) can be arranged so that the secondary electric arcs can be established at least partially simultaneously with the first electric arc.

According to one embodiment, the first arc path may be different from the secondary arc path.

According to one embodiment, the circuit breaker may comprise two connection terminals and, during at least part of the breaking of the electrical circuit comprising the electrical conductor, the first arc path and the secondary arc path can form parallel electrical paths between the two connection terminals.

According to one embodiment, during at least part of the electrical breaking of the electrical circuit comprising the electrical conductor to be broken, the first arc path and the secondary arc path can respectively form a first branch and a second branch defined in parallel with one another, between the first cut end and the second cut end.

According to one embodiment:

the first branch can comprise:

ionized insulating gas of the cut-off chamber, and/or the second branch may comprise a series association of at least:

a first secondary resistive dipole, formed by ionized insulating gas of the cut-off chamber, and a conductive cooling feature, and a second secondary resistive dipole, formed by ionized insulating gas of the cut-off chamber.

According to one embodiment, at least one conductive cooling feature (including the secondary conductive cooling features) can be formed by a metal wire, preferably compacted, and whose diameter is between 0.05 mm and 0.3 mm, and preferably between 0.1 mm and 0.2 mm, limits included. Such wires have a large specific surface area, which facilitates exchanges.

According to one embodiment, at least part of the material of a conductive cooling feature (including the secondary conductive cooling features) can be provided to be eroded by a secondary electric arc during the breaking of the electrical circuit comprising the electrical conductor. Such erosion makes it possible to dissipate energy, in particular if a melting or sublimation of the material occurs with significant stored latent heats.

In the case of a conductive cooling feature made of metal wire, the local thermal inertia is low, so that local melting phenomena can occur to dissipate energy.

According to one embodiment, the circuit breaker may comprise two connection terminals, and the conductive cooling features (including the secondary conductive cooling features) can be arranged to limit, upon electrical breaking of the electrical circuit comprising the electrical conductor to be broken, a maximum voltage across the circuit breaker terminals to 250% of a voltage across the circuit breaker terminals after breaking.

According to one embodiment, the conductive cooling features can be arranged at a distance of between 0.5 mm and 10 mm from one another.

According to one embodiment, the circuit breaker may comprise at least one elongated conductive cooling feature (including the secondary conductive cooling features), and wherein the secondary arc path passes through at least a part of the elongated conductive cooling feature so that:

a first secondary arc can be established between:

a first end of the elongated conductive cooling feature and the first cut end or a first other conductive cooling feature and a second secondary arc can be established between:

a portion shifted from the first end or a second end of the elongated conductive cooling feature and the second cut end or a second other conductive cooling feature.

A second aspect of the invention relates to a pyrotechnic circuit breaker comprising:

a housing, defining a cut-off chamber, an electrical conductor to be cut, at least partially arranged in the housing so as to pass through the cut-off chamber, at least one blade, able to move between a rest position and a final position, and arranged to break at least one portion of the electrical conductor located in the cut-off chamber, when the blade passes from the rest position to the final position, the breaking of the electrical conductor defining a cut area separating a first cut end of the electrical conductor from a second cut end of the electrical conductor, a pyrotechnic actuator, arranged to move the blade from the rest position to the final position when it is actuated, at least one cooling device arranged in the cut-off chamber for cooling gases present in the cut-off chamber after actuating the pyrotechnic actuator, the circuit breaker having a first arc path allowing a first electric arc to be established directly from the first cut end to the second cut end, characterized in that the cooling device comprises at least one conductive cooling feature arranged in the cut-off chamber so that the circuit breaker has a secondary arc path different from the first arc path and allowing secondary arcs to be established between the first cut end, the conductive cooling feature, and the second cut end.

According to the above implementation, the cooling device may comprise a single conductive cooling feature, which forms part of the secondary arc path (it is possible to provide several conductive cooling features, of course). This makes it possible to offer the first arc path which passes directly from one cut end to the other, and the secondary arc path which passes through at least one conductive cooling feature to increase the efficiency of the heat absorption, with secondary electric arcs which arrive or start directly from the conductive cooling feature.

In particular, secondary electric arcs can traverse the secondary arc path, before, during or after one or more first electric arcs traverse the first arc path.

In particular, the first arc path and the second arc path can define paths or branches or portions of parallel electrical circuits within the circuit breaker.

According to one embodiment, the first arc path and the second arc path can define paths or branches or parallel electrical circuit portions within the circuit breaker, and:

the first arc path may exhibit one or more cut areas in series, each traversed by a first electric arc directly established between its cut ends (several first electric arcs are established in series), and/or the second arc path may have or comprise one or more conductive cooling features with a plurality of secondary electric arcs for connecting (via the conductive cooling feature(s)) one cut end to another cut end of a same cut area or not (several secondary electric arcs are established in series).

According to one embodiment, the circuit breaker may comprise a plurality of blades, so as to define:

several cut areas each able to separate: a first cut end of the electrical conductor from a second cut end of the electrical conductor and at least one free section of electrical conductor after the breaking, and the first and the second arc path are distinct and independent. In other words, the electric arcs of the first arc path are established between components different from those whereupon the arcs of the second arc path are established; with the exception of the first and second ends. In other words, none of the arcs of the second path are established on the free section.

The dependent implementations related to the first aspect and described above are also applicable to the second aspect of the invention.

A third aspect of the invention relates to a motor vehicle, comprising at least one circuit breaker according to the first aspect of the invention.

DESCRIPTION OF THE FIGURES

Other features and advantages of the present invention will become more apparent upon reading the following detailed description of an embodiment of the invention, which is provided by way of example but in no manner limited thereto, and illustrated by the attached drawings, in which:

FIG. 1 shows a perspective cross-section of a circuit breaker according to the invention, before breaking an electrical conductor of the circuit breaker;

FIG. 2 shows a portion of the upper housing of the circuit breaker of FIG. 1;

FIG. 3 shows the upper housing portion of FIG. 2 in a bottom view;

FIG. 4 shows a cross section of the circuit breaker of FIG. 1 after the electrical conductor is broken;

FIG. 5 shows a graph with measurement curves done during a breaking test of an electrical circuit comprising a circuit breaker according to the present invention.

DETAILED DESCRIPTION OF EMBODIMENT(S)

FIG. 1 shows a pyrotechnic circuit breaker comprising:

- a housing 10 formed by an upper shell 10*a* and a lower shell 10*b*, and defining a cut-off chamber 15,
- an electrical conductor 20,
- a plurality of blades 31*a*, 31*b*, 31*c* secured to or forming part of a piston 30 housed and provided to slide in the housing 10,
- a pyrotechnic actuator 40,
- at least one cooling device 50 comprising a plurality of conductive cooling features 51*a*, 52, 51*b* (visible in FIG. 2).

The housing 10 is formed by the upper shell 10*a* and the lower shell 10*b*, which are mounted on one another by sandwiching the electrical conductor 20. As can be seen in FIG. 2, peripheral holes are provided in the upper shell 10*a* and the upper shell 10*a* is attached to the lower shell 10*b* is by screws or rivets. It is, however, possible to provide other attachment methods with legs, fastening tabs by elastic interlocking, etc. The upper shell 10*a* is provided in a single piece made of plastic material, for example injected, and the lower shell 10*b* is formed in this example by a metal casing 11 and an overmolded skin 12 made of plastic material. However, a metal casing can be provided for the upper shell 10*a*, and/or only the injected plastic material can be provided for the lower shell 10*b*. It is possible to provide a polymeric material, such as for example polyamide, and a filler or reinforcing material may also be provided, such as glass fibers.

The electrical conductor 20 supports an overmolded spacer 13 (a polymer such as for example polyamide) which is received in the upper shell 10*a* and the lower shell 10*b* forming the housing 10. The central portion of the conductor 20 is thinned and passes through the cut-off chamber 15, delimited at the top by the upper shell 10*a* and at the bottom by the piston 30. The two ends of the electrical conductor 20 comprise holes, in order to form two connection terminals to connect or integrate the circuit breaker to an electrical circuit, such as for example the power, traction or propulsion circuit of an electric or hybrid vehicle.

In detail, the cut-off chamber 15 is delimited at the top by matrices 14*a*, 14*b*, 14*c*, 14*d* of the upper shell 10*a* and at the bottom by the blades 31*a*, 31*b*, 31*c* of the piston 30. It can be noted that the matrices 14*a*, 14*b*, 14*c*, 14*d* and the blades 31*a*, 31*b*, 31*c* are respectively arranged on either side of the electrical conductor 20. In addition, the matrices 14*a*, 14*b*, 14*c*, 14*d* and the blades 31*a*, 31*b*, 31*c* are respectively offset relative to one another in order to be able to interlock with one another during a movement of the piston 30 while breaking the electrical conductor 20. In the example given, the matrices 14*a*, 14*b*, 14*c*, 14*d* and the blades 31*a*, 31*b*, 31*c* are provided to be able to mechanically disconnect the electrical conductor by shearing, in particular at three shear lines arranged between the blade 31*a* and the matrix 14*b*, between the matrix 14*b* and the blade 31*b*, and between the matrix 14*d* and the blade 31*c*. This will be detailed in the description relative to FIG. 4.

The upper shell 10*a* also comprises a cooling device 50 comprising a plurality of conductive cooling features 51*a*, 52, 51*b*. In this embodiment, these conductive cooling features 51*a*, 52, 51*b* all have a lower end which opens or which is comprised in the cut-off chamber 15 and, inter alia, serves to cool the gases of the cut-off chamber which can be heated by electric arcs in order to store and/or diffuse heat and limit temperature increases of the housing 10. In the given example, the conductive cooling features 51*a*, 52, 51*b* are metallic and can be formed with a compacted metal wire to give them their final shape.

In FIG. 2, it can be seen that the circuit breaker comprises ten conductive cooling features 51*a*, 52, 52*b* that are arranged to form three rows separated by the matrices 14*b* and 14*c*. On the ten conductive cooling features 51*a*, 52, 51*b* forming the cooling device 50, a first conductive cooling feature 51*a*, secondary conductive cooling features 52, and a last conductive cooling feature 51*b* can be distinguished.

It should be noted that the first conductive cooling feature 51*a* and the last conductive cooling feature 51*b* more broadly exceed the upper shell 10*a* (see FIG. 2) and/or open more deeply into the cut-off chamber 15, to be closer to the electrical conductor 20 than the secondary conductive cooling features 52 (see FIG. 4). However, in this embodiment, no portion of the electrical conductor 20 touches or physically contacts the one or the other of the conductive cooling features 51*a*, 52, 51*b*, before, during, or after the mechanical breaking. In other words, the electrical conductor 20 (or its portions that have been detached during the mechanical breaking) is always physically separated from the conductive cooling features 51*a*, 52, 51*b*, in particular by air, which is an insulating medium, or which can become conductive if it is ionized during the formation of an electric arc).

As explained above, the piston 30 (shown in FIG. 1 in the rest position) is provided to be able to move in the housing 10, and the pyrotechnic actuator 40 is provided in the lower portion of the housing 10 for this purpose. In particular, the pyrotechnic actuator 40 (typically an electro-pyrotechnic igniter) is embedded on the lower shell 10*b* and leads into a combustion chamber 32 formed in the piston 30. During actuation of the pyrotechnic actuator 40, hot gases and particles are expelled into the combustion chamber 32, where the pressure increases rapidly, which pushes the piston 30 to leave the rest position of FIG. 1 to go to a final position as shown in FIG. 4.

During the passage of the piston 30 from the rest position to the final position, the blades 31*a*, 31*b*, 31*c* were able to break the electrical conductor 20 along three shear lines as seen above, to form two detached strands or detached sections, in cooperation with the matrices 14*a*, 14*b*, 14*c*, 14*d*. In fact, FIG. 4 shows the circuit breaker of FIG. 1 with the piston 30 in the final position, and the electrical conductor 20 has been broken and now forms a first and a second embedded portion 21 and 24, respectively, a first free section 22 and a second free section 23.

It can be noted in FIG. 4 that the first free section 22 is trapped between the blade 31*a*, the blade 31*b* and the matrix 14*a*, so that its position is entirely imposed and controlled. For its part, the second free section 23 has been folded by ribs located on the blade 31*b* and on the blade 31*c*, and is held in abutment on the matrix 14*c* by these ribs of the piston 30, so that its position is also entirely imposed and controlled.

The breaking along the three shear lines therefore generates three cut areas, with each cut area separating a first cut end of the electrical conductor from a second cut end of the electrical conductor. Indeed, in the example shown in FIG. 4:

- a cut area separates a first cut end 21*c*1 of the first embedded portion 21 from a second cut end 22*c*1 of the free section 22,
- another cut area separates a first cut end 22*c*2 of the free section 22 from a second cut end 23*c*1 of the free segment 23,
- yet another cut area separates a first cut end 23*c*2 of the free section 23 from a second cut end 24*c*1 of the second embedded portion 24.

It should be noted that the terms "first" cut end and "second" cut end are arbitrary, since each cut area separates two cut ends from one another. The example circuit breaker here leads to generating two free sections 22 and 23, but it is possible to have no free section, a single free section, or more than two free sections.

As indicated above, the circuit breaker according to the present invention is typically intended to be integrated or used in the electrical circuit of a motor vehicle, and in particular in the electrical traction or propulsion circuit of an electric or hybrid motor vehicle. Depending on the load and/or use conditions of the vehicle, the electrical conductor 20 can be traversed by electrical currents comprised in a range extending from 0 A to 25,000 A or even 30,000 A, and a voltage across the circuit breaker terminals after breaking may be in a range extending from a few tens of volts to several hundred or thousand volts.

In these intensity or voltage ranges, during the mechanical breaking of the electrical conductor 20, electric arcs are inevitable and can be established between the cut ends of a same cut area, especially at the start of the mechanical breaking of the electrical conductor 20, when the cut ends of a same cut area separate and begin to move away from one another. The electrical breaking of the circuit occurs when the electric arcs are extinguished, and it is therefore important to guarantee rapid extinction of the electric arcs. Typically, the electrical breaking may occur when the arc voltage becomes greater than the voltage across the terminals of the circuit breaker, after breaking.

The circuit breaker according to the present invention is designed to be able to have different and distinct arc paths during the electrical breaking process of the electrical circuit wherein the circuit breaker is integrated.

In particular, a first arc path allows at least a first arc to be established from the first cut end to the second cut end of a same cut area.

In the example which is the subject matter of the figures, referring to FIG. 4 (while keeping in mind that FIG. 4 shows the piston 30 in the final position, while the first electric arcs can be established as soon as the cut areas mechanically separate two cut ends), three first electric arcs can be established along this first arc path:

- from the first cut end 21*c*1 of the first embedded portion 21 to the second cut end 22*c*1 of the free section 22,
- from the first cut end 22*c*2 of the free section 22 to the second cut end 23*c*1 of the free section 23,
- from the first cut end 23*c*2 of the free section 23 to the second cut end 24*c*1 of the second embedded portion 24.

Furthermore, a secondary arc path is provided to pass through at least a portion of the multitude of conductive cooling features 51*a*, 52, 51*b*, to allow secondary electric arcs to be established between one conductive cooling feature and at least one other conductive cooling feature.

In other words, in the circuit breaker according to the invention, and during the electrical breaking of the electrical circuit which comprises the electrical conductor 20, first electric arcs can be established directly between the cut ends of the same cut area to conduct current directly between the cut ends (the first arc path), and secondary electric arcs can be established by passing through conductive cooling features to conduct current indirectly between cut ends (the secondary arc path).

Thus, the electrical breaking remains rapid since first electric arcs can be established, but the secondary arc path provides more efficient dissipation of energy and/or heat, with secondary electric arcs which pass via or through the conductive cooling features.

More precisely, provision may be made for the secondary arc path to comprise a passage of electricity via all the conductive cooling features. With reference to FIG. 3 and FIG. 4, provision may be made to establish:

- a first secondary arc between the first cut end 21*c*1 and the first conductive cooling feature 51*a,*
- a series of secondary arcs between the first conductive cooling feature 51*a* the adjacent secondary conductive cooling feature 52, the secondary conductive cooling features 52 adjacent in pairs, and up to the last conductive cooling feature 51*b,*
- a last secondary arc between the last conductive cooling feature 51*b* and the second cut end 24*c*1. According to this implementation, there are eleven secondary electric arcs.

With reference to FIG. 3, a secondary electric arc is established between each of the conductive cooling features adjacent in pairs, to "bypass" the matrices 14*b* and 14*c*. Starting from the first conductive cooling feature 51*a*, the secondary arc path climbs the left row to the last secondary conductive cooling feature of the row, with reference 52*fr*1, and then passes over the middle row to the first secondary conductive cooling feature of this row, with reference 52*pr*2, to descend the middle row to the last secondary conductive cooling feature of this row 52*fr*2, and passes to the first secondary conductive cooling feature of the right row bearing reference 52*pr*3, to finally go to the last conductive cooling feature 51*b*.

With reference to FIGS. 2 and 4, the first conductive cooling feature 51*a* and the last conductive cooling feature 51*b* are each closer to the electrical conductor 20 than the other secondary conductive cooling features 52, so that this guarantees that there is no secondary electric arc between any part of the electrical conductor 20 and one of the other secondary conductive cooling features 52.

Thus, according to this implementation, the secondary arc path is distinct and different from the first arc path, and provides a parallel electrical path. Depending on the geometry of the cut-off chamber, provision may be made for the secondary electric arcs to be established from a certain moment, and/or from a certain intensity/voltage pair of the current which passes through the electrical circuit to be broken. As an influent parameter, mention may be made of:

the distance between the electrical conductor 20, the first conductive cooling feature 51*a*, and the last conductive cooling feature 51*b*, and/or the distance between two adjacent conductive cooling features, and/or the number of adjacent conductive cooling features, and therefore the number of secondary electrical arcs, etc.

By varying these parameters, it is possible to define a second arc path whose resistivity during operation will be less than the resistivity along the first arc path so that arcs are established on the second path. It is understood that the conditions resulting in the formation of secondary electric arcs can become favorable only at a given moment of the displacement of the piston, during the mechanical breaking of the electrical conductor.

In particular:

at the start of mechanical breaking, it can be provided that only the first arc path will be favorable, and only first arcs will be established;

from a first given displacement of the piston (for example from a certain distance between a cut end and one or several conductive cooling features), the conditions for establishing secondary arcs on the secondary arc path will be very much as favorable as those of the first arc path, and secondary electric arcs can be established simultaneously with the first electric arcs;

from a second given displacement of the piston (for example from a certain distance between two cut ends of a same cut area), the conditions for establishing secondary arcs on the secondary arc path will be more favorable than those of the first arc path, and only secondary electric arcs can be established while the first electric arc(s) will be extinguished.

In addition, it may be provided to force a plastic part of the walls of the cut-off chamber 15 to be removed by ablation, for example by the first electric arcs, in particular when they pass through the reduced space between the blades 31*a* and 31*b* and the matrix 14*b*, just before the piston arrives in the final position of FIG. 4. It is optionally possible also to provide a groove between the blades 31*a* and 31*b* and the matrix 14*b* so as to form a restricted passage between the blades 31*a* and 31*b* and the matrix 14*b* which will preferentially be used by the first electric arcs, and this may promote an ablation of plastic material. Such an ablation of plastic material can modify the composition of the gases of the cut-off chamber and promote rapid extinguishing of the electric arcs.

FIG. 5 shows a graph with measurement curves done during a breaking test of an electrical circuit comprising the circuit breaker of FIG. 1 with the electrical conductor 20 through which electrical current passes. In the example shown, the electrical current has an intensity Icc of 2000 A, a voltage Vbatt of 835 V, and the electrical circuit has an impedance of 14 μH.

Five curves are shown in the graph of FIG. 5. The curve Icc represents the total intensity of the current that passes through the circuit breaker (before breaking the intensity is 2000 A, after breaking the intensity is 0 A). The curve Vbatt represents the constant voltage across the terminals of the current generator of the electrical circuit comprising the circuit breaker. In this example, the voltage is 835 V. The curve Maf represents the firing current, in amps, applied to the pyrotechnic actuator 40. The curve Vcc represents the voltage measured across the terminals of the circuit breaker. Before the electrical conductor 20 is broken, this voltage is practically 0 V, since the electrical conductor 20 has a virtually zero electrical resistance, and after breaking, the voltage across the terminals of the circuit breaker is equal to the voltage of the current generator, that is, 835 V). The curve Irc represents the measurement of the intensity of the electrical current between two adjacent secondary conductive cooling features 52. In other words, Irc represents the intensity of the current flowing through the secondary arc path.

During the test, the firing of the pyrotechnic actuator is carried out at 1.45 ms, and the electrical circuit (the resistive bridge of the electro-pyrotechnical igniter) is broken at about 1.6 ms; the pyrotechnic actuator is then in the process of generated hot gases and particles in the combustion chamber 32 to cause the movement of the piston 30. At 1.9 ms, the voltage Vcc across the terminals of the circuit breaker begins to increase, which indicates that the electrical conductor 20 is broken and that first electric arcs are traversing the first arc path. The total intensity Icc of the current traversing the circuit breaker begins to drop. However, the intensity Irc of the electrical current between two adjacent secondary conductive cooling features 52 is zero, which indicates that the electrical current only passes through the first arc path.

At 2.0 ms, the intensity Irc of the electrical current between two adjacent secondary conductive cooling features 52 begins to increase, which indicates that secondary electric arcs have been established along the secondary arc path. It can be noted that the slope of the voltage Vcc bends approximately at this instant of 2.0 ms. At this instant, electrical current passes through the first arc path, and also through the secondary arc path.

At a little less than about 2.1 ms, the intensity Irc of the electrical current between two adjacent secondary conductive cooling features 52 becomes equal or substantially equal to the total intensity Icc of the current which passes through the circuit breaker and which continues to decrease. Consequently, at this instant, all the current flowing through the circuit breaker passes through the secondary arc path. It can also be noted that at this instant, the slope of rise of the voltage Vcc across the terminals of the circuit breaker has inflections, while continuing to increase.

At about 2.3 ms, the voltage Vcc across the terminals of the circuit breaker becomes greater than the voltage Vbatt across the terminals of the current generator, and the total intensity Icc of the current which passes through the circuit breaker becomes zero. From this instant, the electrical circuit is broken, following the mechanical breaking of the electrical conductor 20.

The following points can be noted:

the circuit breaker has a first arc path and a secondary arc path which are different and which form two portions or two parallel circuit branches within the circuit breaker, at the start of the breaking process, only the first arc path is traversed by electrical current (it may be said that the secondary arc path comprises or forms an open switch), during at least part of the breaking process, the first arc path and the secondary arc path are simultaneously traversed by electrical current (both branches are on), at the end of the breaking process, only the secondary arc path is traversed by the electrical current (the first arc path can be said to comprise or form an open switch).

It may be noted that the first arc path comprises one or more cut areas, with first electric arcs which can be directly established between the two cut ends of each cut area, while the secondary arc path can allow a cut end of one cut area to be connected to a cut end of another cut area.

Depending on the configuration of the circuit breaker, it is possible to configure the parameters listed below to adapt the instants where the first and/or the secondary arc path will be traversed by electrical current during the breaking process, based upon the intensity and the voltage imposed by the current generator of the electrical circuit:

- distance between the cut ends of the same cut area, in particular once the piston 30 is in the final position,
- distance between the electrical conductor 20 and the first conductive cooling feature 51*a* or the last conductive cooling feature 51*b* before breaking,
- distance between at least one cut end of the electrical conductor 20 and the first conductive cooling feature 51*a* or the last conductive cooling feature 51*b* during the breaking and/or once the piston 30 is in the final position,
- total number of conductive cooling features 5*a*, 52, 51*b* of the secondary arc path,
- distance between the adjacent conductive cooling features 5*a*, 52, 51*b*,
- number of cut areas,
- presence of restricted passages (blade—matrix contact, for example) between two cut ends on the first arc path,
- presence of a plastic material to be removed by ablation or not, etc.

INDUSTRIAL APPLICATION

A circuit breaker according to the present invention, and its manufacture, are capable of industrial application.

It will be understood that various modifications and/or improvements which are obvious to a person skilled in the art may be made to the different embodiments of the invention described in the present description without departing from the scope of the invention. In particular, it may be noted that the first arc path comprises one or more cut areas, with first electric arcs which can be directly established between the two cut ends of each cut area, while the secondary arc path can allow a cut end of one cut area to be connected to a cut end of another cut area (or of the same cut area).

The invention claimed is:

1. A pyrotechnic circuit breaker comprising:

a housing, defining a cut-off chamber, an electrical conductor to be broken, arranged to form part of an electrical circuit, and at least partially arranged in the housing so as to pass through the cut-off chamber, at least one blade, able to move between a rest position and a final position, and arranged to break at least one portion of the electrical conductor located in the cut-off chamber, when the blade passes from the rest position to the final position, the break of the at least one portion of the electrical conductor defining a cut area separating a first cut end of the electrical conductor from a second cut end of the electrical conductor, a pyrotechnic actuator, arranged to move the blade from the rest position to the final position when it is actuated, at least one cooling device arranged in the cut-off chamber for cooling gases present in the cut-off chamber after actuating the pyrotechnic actuator, the circuit breaker having a first arc path allowing a first electric arc to be established directly from the first cut end to the second cut end, characterized in that the cooling device comprises a plurality of conductive cooling features so that the circuit breaker has a secondary arc path allowing secondary electric arcs to be established:

from the first cut end to a first conductive cooling feature, from the first conductive cooling feature to one of a second conductive cooling feature and a third conductive cooling feature, and from one of the second conductive cooling feature and the third conductive cooling feature to the second cut end.

2. The circuit breaker according to claim 1, wherein the conductive cooling features are arranged at a predetermined distance from the electrical conductor and the first cut end and the second cut end.

3. The circuit breaker according to claim 2, wherein the predetermined distance is defined so as to constantly ensure a clearance between each of the conductive cooling features and the electrical conductor and the first cut end and the second cut end, during and after the break of the electrical conductor.

4. The circuit breaker according to claim 1, wherein the conductive cooling features are arranged in the cut-off chamber so that secondary electric arcs can be established along the secondary arc path only if before and during the break, the electrical conductor is traversed by an electrical current having an intensity greater than a threshold intensity and if after the break, a voltage across the circuit breaker terminals is greater than a threshold voltage.

5. The circuit breaker according to claim 1, wherein the first arc path has a restriction or narrow passage area so that the secondary electric arcs can be established along the secondary arc path only if, upon the break, the electrical conductor is traversed by an electrical current having an intensity greater than a threshold intensity and if, after the break, a voltage across the circuit breaker terminals is greater than a threshold voltage.

6. The circuit breaker according to claim 1, wherein secondary electric arcs are established between at least two adjacent conductive cooling features.

7. The circuit breaker according to claim 6, wherein the conductive cooling features are discrete and each separated from one another by a predetermined intermediate distance.

8. The circuit breaker according to claim 7, wherein two adjacent conductive cooling features located on the secondary arc path and separated by a predetermined intermediate distance are each spaced apart from the electrical conductor, and the first cut end and the second cut end by a distance greater than said intermediate distance.

9. The circuit breaker according to claim 1, comprising at least three conductive cooling features on the secondary arc path, so as to define the first conductive cooling feature and the third conductive cooling feature located on the secondary arc path, and wherein the first conductive cooling feature and the third conductive cooling feature are each arranged closer to the electrical conductor, and the first cut end and the second cut end than the second conductive cooling features.

10. The circuit breaker according to claim 1, wherein at least two conductive cooling features are separated by an insulating wall comprising one of a recess or a hole situated on the secondary arc path.

11. The circuit breaker according to claim 10, wherein the two conductive cooling features separated by the insulating wall each have two ends, with a first end facing the cut-off chamber and the electrical conductor, and wherein the one of the recess or hole is one of offset from the first end, or arranged on the side of a second end of each conductive cooling feature opposite the first end.

12. The circuit breaker according to claim 1, comprising a plurality of blades, so as to define:

several cut areas each separating the first cut end of the electrical conductor from the second cut end of the electrical conductor and at least one free section of electrical conductor after the breaking, and the first arc path allowing the first electric arc to be directly established from the first cut end to the second cut end of a cut area and another first arc to be directly established from the first cut end to the second cut end of another cut area.

13. The circuit breaker according to claim 12, comprising only one secondary arc path passing through at least two conductive cooling features to allow secondary electric arcs to be established from the first cut end of said one cut area to the second cut end of said another cut area.

14. The circuit breaker according to claim 1, wherein the first arc path is different from the secondary arc path.

15. A pyrotechnic circuit breaker comprising:

a housing, defining a cut-off chamber, an electrical conductor to be broken, arranged to form part of an electrical circuit, and at least partially arranged in the housing so as to pass through the cut-off chamber, at least one blade, able to move between a rest position and a final position, and arranged to break at least one portion of the electrical conductor located in the cut-off chamber, when the blade passes from the rest position to the final position, the break of the at least one portion of the electrical conductor defining a cut area separating a first cut end of the electrical conductor from a second cut end of the electrical conductor, a pyrotechnic actuator, arranged to move the blade from the rest position to the final position when it is actuated, at least one cooling device arranged in the cut-off chamber for cooling gases present in the cut-off chamber after actuating the pyrotechnic actuator, the circuit breaker having a first arc path allowing a first electric arc to be established directly from the first cut end to the second cut end, characterized in that the cooling device comprises a plurality of conductive cooling features so that the circuit breaker has a secondary arc path allowing secondary electric arcs to be established:

from the first cut end to a first conductive cooling feature, from the first conductive cooling feature to one of a second conductive cooling feature and a third conductive cooling feature, from one of the second conductive cooling feature and the third conductive cooling feature to the second cut end and further comprising two connection terminals, wherein the conductive cooling features are arranged to limit, upon electrical breaking of the electrical circuit comprising the electrical conductor to be broken, a maximum voltage across the circuit breaker terminals to 250% of a voltage across the circuit breaker terminals after breaking.

* * * * *